US 8,781,423 B2
Jul. 15, 2014

(12) United States Patent
Cowling et al.

(10) Patent No.: US 8,781,423 B2
(45) Date of Patent: Jul. 15, 2014

(54) SIGNAL INTERFERENCE DETECTION AND AVOIDANCE VIA SPECTRAL ANALYSIS

(75) Inventors: Thomas J. Cowling, Des Moines, WA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 394 days.

(21) Appl. No.: 12/759,756

(22) Filed: Apr. 14, 2010

(65) Prior Publication Data

US 2011/0258678 A1 Oct. 20, 2011

(51) Int. Cl.
*H04B 7/00* (2006.01)

(52) U.S. Cl.
USPC ..................................... 455/226.1; 455/3.05

(58) Field of Classification Search
USPC ............... 455/63.1, 67.13, 226.1, 226.4, 311, 455/2.01, 3.01–3.06, 67.11, 67.7; 370/317, 370/332, 333; 725/125–126, 131; 324/76.19, 76.11; 705/14.1
See application file for complete search history.

(56) References Cited

U.S. PATENT DOCUMENTS

| 5,818,389 | A * | 10/1998 | Lazar | 342/383 |
| 6,741,293 | B1 * | 5/2004 | Obuchi | 348/554 |
| 7,269,151 | B2 | 9/2007 | Diener et al. | |
| 7,424,268 | B2 | 9/2008 | Diener et al. | |
| 2004/0203474 | A1 * | 10/2004 | Miller et al. | 455/69 |
| 2007/0253394 | A1 * | 11/2007 | Horiguchi et al. | 370/338 |
| 2009/0011463 | A1 | 1/2009 | Weyler et al. | |
| 2009/0111463 | A1 | 4/2009 | Simms et al. | |
| 2009/0232189 | A1 | 9/2009 | Junell et al. | |
| 2011/0001833 | A1 * | 1/2011 | Grinkemeyer et al. | 348/192 |
| 2011/0222466 | A1 * | 9/2011 | Pance et al. | 370/316 |

FOREIGN PATENT DOCUMENTS

| CN | 1040892 A | 3/1990 |
| CN | 1666540 A | 9/2005 |
| CN | 101378310 A | 3/2009 |
| WO | WO 2010/000695 A1 | 1/2010 |

OTHER PUBLICATIONS

European Patent Office, Search Report and Written Opinion dated Mar. 4, 2011, Application No. PCT/US2010/055055, 11 pages.
European Patent Office, Office Action dated Jul. 16, 2013, Application No. 10778774.9, 5 pages.
Chinese Patent Office, Office Action (with translation) mailed Jan. 27, 2014, Application No. 201080067411.2, 17 pages.

\* cited by examiner

*Primary Examiner* — Nay A Maung
*Assistant Examiner* — Angelica M Perez
(74) *Attorney, Agent, or Firm* — Haynes and Boone, LLP

(57) ABSTRACT

In one embodiment, an apparatus for minimizing signal interference for a network device is provided. The apparatus includes a receiver configured to detect an interference signal. The apparatus also includes a signal analyzer that is configured to analyze the detected interference signal. The apparatus further includes an interface. The interface is configured to advertise detection of the interference signal as a service offered by the apparatus to the network device. The interface is configured to accept a request from the network device to subscribe to the service. The interface is also configured to alert the network device when the interference signal is detected.

18 Claims, 7 Drawing Sheets

SIGNAL INTERFERENCE DETECTION AND AVOIDANCE VIA SPECTRAL ANALYSIS

TECHNICAL FIELD

The present disclosure relates generally to network management, and more particularly, to network management in the presence of interference signals.

BACKGROUND

Rapid growth in the fields of telecommunication and networking has led to the deployment of multiple network devices using different technologies that all operate on the same network. Frequency bands occupied by these network devices may also overlap. As a result, signals transmitted by a network device using one technology may become interference signals for another network device. The interference signals impede the intended operation of the network device that is being interfered, thereby degrading the performance of the network.

As an example, network devices using a coaxial technology such as Multimedia over Coax Alliance (MoCA) as well as network devices using a power line technology such as HomePlug may operate in a frequency range that is below 50 mega-hertz (MHz). Operation in this frequency range could interfere with upstream transmission over network devices using a Data Over Cable Service Interface Specification (DOCSIS) technology. As another example, the MoCA or HomePlug network devices may also operate in a frequency range from 50 MHz to 1 giga-hertz (GHz), which could interfere with satellite TV devices.

Some existing techniques of dealing with the signal interference problem may involve changing the frequency band of operation for the interfering or interfered devices. The drawback of such techniques is that as available frequency spectrum becomes increasingly scarce, it may be impractical to constantly change the frequency band of operation. Other techniques may involve setting up agents at access points of the networks to gather information with respect to a particular frequency band. The agents may report the gathered information back to a centralized server. The server then manages the devices on the network after analyzing the gathered information. However, these techniques may be limited to a particular type of communications protocol and may also increase network inefficiencies since a centralized server is required.

Therefore, although existing techniques of dealing with signal interference problems have been generally adequate for their intended purposes, they have not been entirely satisfactory in every aspect.

DESCRIPTION

Overview

One embodiment of the present disclosure involves an apparatus. The apparatus includes: a frequency-agile tuner; a signal analyzer that is configured to analyze the detected interference signal; and an interface that is configured to: advertise detection of the interference signal as a service offered by the apparatus to the network device; accept a request from the network device to subscribe to the service; and alert the network device when the interference signal is detected.

Another embodiment of the present disclosure involves a system. The system includes: a receiver that is configured to detect an interference signal; an analyzer that is configured to analyze the detected interference signal and make a recommendation for a selected one of a plurality of network devices based on the analysis; and a controller interface that is configured to: advertise to the network a list of services offered by the system, the detection of the interference signal being one of the services; allow the network devices to selectively subscribe to the list of services; broadcast the detection of the interference signal as an event to the network; and send the recommendation to the selected network device.

DESCRIPTION OF EXAMPLE EMBODIMENTS

Figure 1:
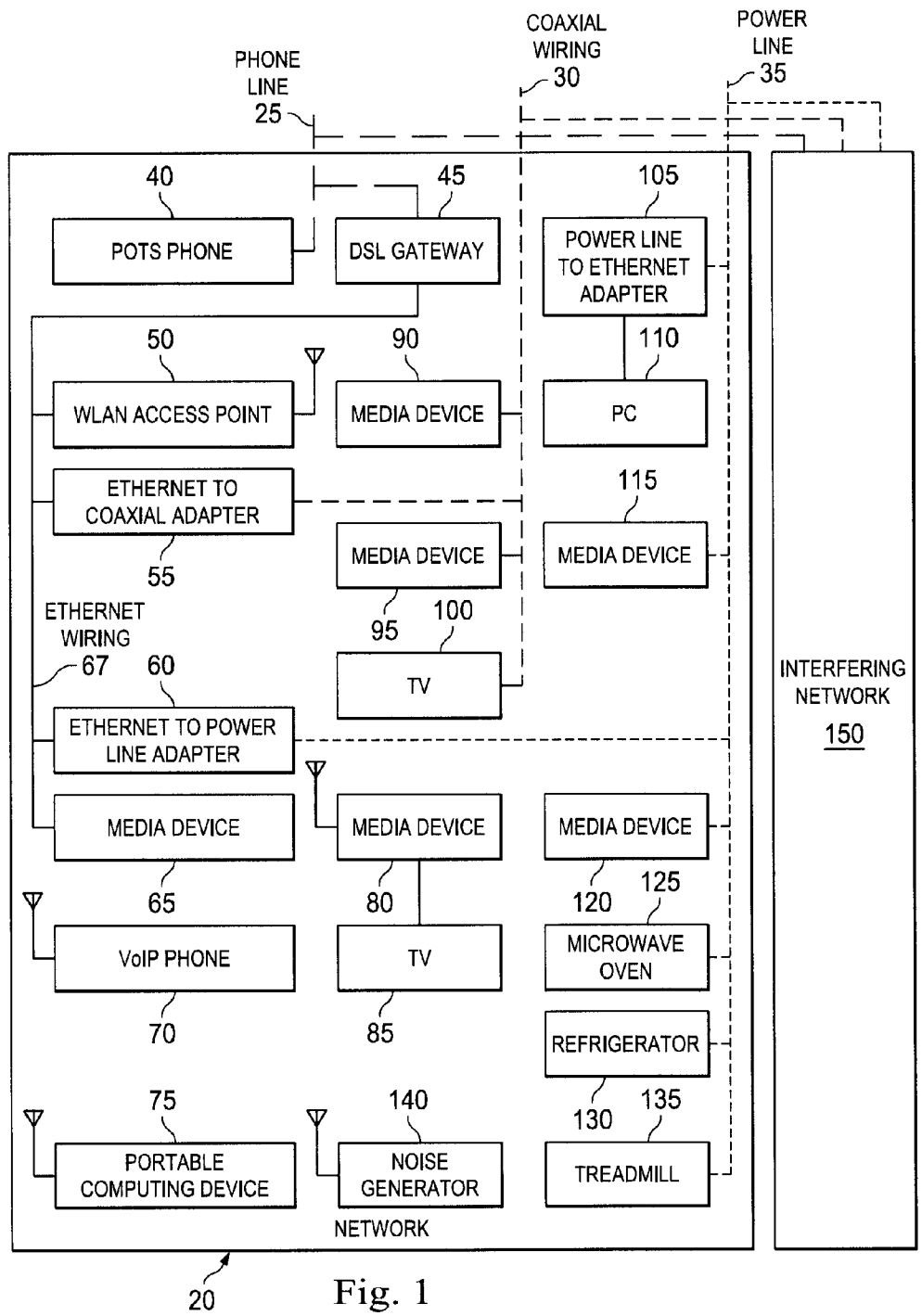
FIG. 1 is a simplified diagrammatic view of an example network.

FIG. 1 illustrates a simplified diagrammatic view of an example network 20. The network 20 may be implemented in a home or in an office and may include a phone line 25, coax wiring 30, and a power line 35 that each extend beyond (outside) the network 20. A Plain Old Telephone Service (POTS) phone 40 and a Digital Subscriber Line (DSL) gateway 45 may be coupled to the phone line 25. The POTS phone 40 may be a traditional analog phone or may be a Digitally Enhanced Cordless Technology (DECT) digital phone that includes a base station and one or more handsets. The DSL gateway 45 may include routers and switches and may allow network devices coupled to the DSL gateway 45 to gain access to the Internet and to be networked with one another.

The DSL gateway 45 may be coupled to a wireless local area network (WLAN) access point 50, an Ethernet-to-coax adaptor 55, an Ethernet-to-power-line adaptor 60, and a media device 65, through Ethernet wiring 67. The WLAN access point 50 allows for wireless transmission of signals. The WLAN access point 50 may be a Wi-Fi router and allows wireless transmission of Wi-Fi signals. The WLAN access point 50 may also be integrated into the DSL gateway 45.

The Ethernet-to-coax adaptor 55 may be coupled to the coax wiring 30, thereby bringing local network connectivity and Internet connectivity to network devices that are coupled to the coax wiring 30. The Ethernet-to-power-line adaptor 60 may be coupled to the power line 35, thereby bringing local network connectivity and Internet connectivity to network devices that are coupled to the power line 35. It is understood that the Ethernet-to-coax adaptor 55 and the Ethernet-to-power-line adaptor 60 may each include more than one physical adaptor, and that they need not be discrete stand-alone devices and may be embedded in the DSL gateway 45 or the WLAN access point 50. The media device 65 may be a device that can source or sink various types of media content, including data and voice content. For example, the media device 65 may be implemented as a set top box.

The WLAN access point 50 may be wirelessly coupled to a Voice-over-IP (VoIP) phone 70, a portable computing device 75 (e.g., a Personal Digital Assistant (PDA) or a laptop computer), and a media device 80. For example, in an embodiment where the WLAN access point 50 is a Wi-Fi device, the VoIP phone 70, the portable computing device 75 and the media device 80 may each include a Wi-Fi transceiver so as to be able to wirelessly communicate with the WLAN access point 50 under the Wi-Fi protocol. The media device 80 may also be coupled to a television set (TV) 85. The media device 80 is capable of retrieving data from the DSL gateway 45 through the WLAN access point 50, converting the retrieved data into suitable video signals (for example in a High-Definition-Multimedia-Interface (HDMI) format), and then outputting the suitable video signals to the TV 85 to be played.

Media devices 90 and 95 as well as a TV 100 may be coupled to the coax wiring 30. The coax wiring 30 may be coupled to the Ethernet-to-coax adaptor 55 and may be capable of distributing digital content using coax protocols such as Multimedia over Coax Alliance (MoCA). A power-line-to-Ethernet adaptor 105 is coupled to the power line 35, and a personal computer (PC) 110 is coupled to the power-line-to-Ethernet adaptor 105. Media device 115 and 120, a microwave oven 125, a refrigerator 130, and a treadmill 135 may also be coupled to the power line 35. These devices coupled to the power line 35 may use the power line 35 as a transmission medium under a power line protocol such as HomePlug.

A noise generator 140 may reside in the vicinity of the network 20. For example, the noise generator 140 may be a cordless phone that has a transmitting frequency range that falls within or overlaps with a receiving frequency range of one or more devices on the network 20. In addition, an interfering (or competing) network 150 may be located nearby the network 20. The interfering network 150 may be a home network of a neighboring user and may share the coax wiring 30 or the power line 35 with the network 20. Signals transmitted by devices (not illustrated) on the interfering network 150 may enter the network 20 as interference signals (also referred to interferers or noise) to the network devices on the network 20 since the coax wiring 30, and the power line 35 are shared between the networks 20 and 150. The phone line 25, the coax wiring 30, and the power line 35 may also act as antennas that may pick up interference signals from outside the network 20. Those interference signals may then enter the home network 20 through the phone line 25, coax wiring 30, and power line 35.

It is understood that signals generated by the devices on the network 20 may become interference signals to other devices on the network 20. Also, it is understood that an interference signal may be a signal from the same network protocol, or it may be a signal from a different network protocol. For example, a Wi-Fi signal transmitted by a Wi-Fi network device may be an interference signal to a Bluetooth network device, and the same Wi-Fi signal may also be an interference signal to another Wi-Fi network device on a neighboring (or nearby) wireless network. As another example, a signal transmitted by a coaxial network device may be an interference signal to signals for an incumbent coaxial service (e.g., cable TV, DOCSIS, satellite TV). Furthermore, it is understood that what constitutes an interference signal is viewed from the perspective of a desired signal, and that the desired signal in a first network may be viewed as another interference signal from the perspective of the desired signal in a second network. In other words, if a first signal interferes with a second signal, the first signal may become an interference signal to the second signal. Meanwhile, the second signal may become an interference signal to the first signal.

Figure 2:
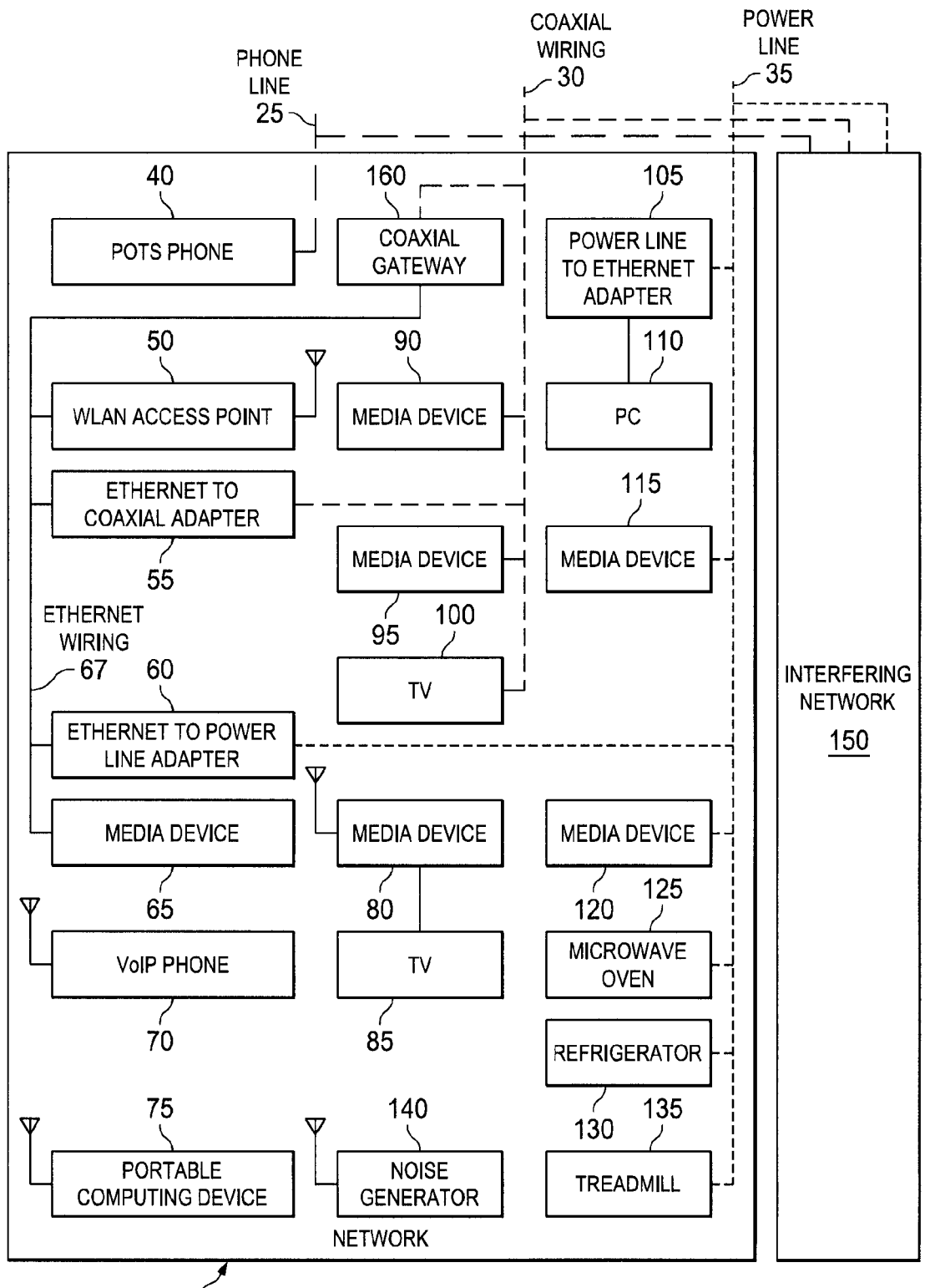
FIG. 2 is a simplified diagrammatic view of an alternative example network.

FIG. 2 illustrates a simplified diagrammatic view of another example network 155. The network 155 is similar to the network 20 of FIG. 1, and for the sake of consistency and simplicity, the devices that are in both the network 20 and the network 155 are labeled identically. In comparison to the network 20, the network 155 may have a gateway 160 connected to the coax cabling instead of the gateway 45 connected to the phone line wiring on the network 20. Otherwise, the network 155 functions in a similar fashion as the network 20.

It is understood that the devices on the networks 20 and 155 are merely example devices, and that the networks 20 and 155 may alternatively include other devices or be configured differently depending on needs of their users. For example, the networks 20 and 155 may have a fiber optic gateway or a cellular 3G or 4G wireless gateway instead of the DSL gateway 45 or the coax gateway 160. The devices in the networks 20 and 155 may also have more than one network interface. For example, the media device 115 in the network 20 of FIG. 1 has a power line interface that allows it to be coupled to the power line 35, but it may also have an Ethernet interface (not illustrated) that allows it to be coupled directly to the Ethernet wiring 67.

For both the networks 20 and 155, the interference signals produced by the noise generator 140, by the interfering network 150, or by other devices on the networks themselves may interfere with the desired operation of the devices on the networks 20 and 155 and may degrade the overall performance of the networks 20 and 155. To address these issues, the present disclosure utilizes one or more cognitive spectrum analyzers to help detect interference signals and recommend courses of action to take for the devices on the networks 20 and 150. The cognitive spectrum analyzers may be stand-alone devices or may be embedded in the devices (also referred to host devices) on the networks 20 and 155, for example embedded in the DSL gateway 45, the coax gateway 160, the WLAN access point 50, or the media devices 65, 80, 90, 95, 115, and 120. The cognitive spectrum analyzer is discussed in more detail below.

Figure 3:
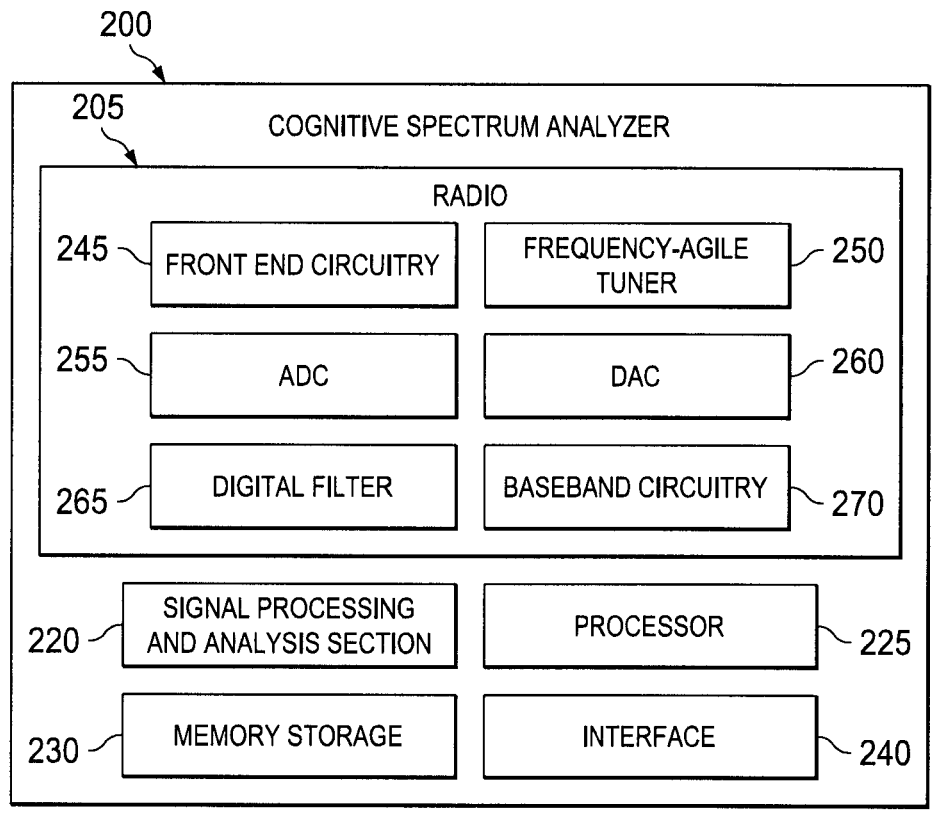
FIG. 3 is a simplified diagrammatic view of a cognitive spectrum analyzer that may be implemented in the example network of FIG. 1 or FIG. 2 according to one embodiment.

FIG. 3 illustrates a simplified diagrammatic view of an example cognitive spectrum analyzer 200. The cognitive spectrum analyzer 200 may include a radio 205, a signal processing and analysis section 220, a processor 225, a memory storage 230, and an interface 240. The radio 205 may include front end circuitry 245, a frequency-agile tuner 250, an analog-to-digital-converter (ADC) 255, a digital-to-analog converter (DAC) 260, a digital filter 265, and baseband circuitry 270.

The front end circuitry 245 may include antennas, preselection filters, and/or low-noise amplifiers. The front end circuitry 245 may include a receiver that is capable of detecting or receiving a wireless or wired signal, for example a signal in the Wi-Fi band, a signal in the MoCA band, or a signal in the HomePlug band. The signal to be detected may be from a frequency band that produces interference signals for devices on a network, for example the host device of the cognitive spectrum analyzer 200. The front end circuitry 245 may optionally include a transmitter that is capable of transmitting a signal to external devices.

The frequency-agile tuner 250 may include mixers, oscillators, phase-locked loops (PLLs), amplifiers, and/or filters. The frequency-agile tuner 250, working in conjunction with the front end circuitry 245, may be able to choose the desired frequency band to be received or monitored by the radio 205. For example, the frequency-agile tuner 250 may be tuned in a manner so that only Wi-Fi signals are received by the radio 205, while HomePlug or MoCA signals are filtered out. Alternatively, the frequency-agile tuner 250 may be tuned in a manner so that only MoCA signals are received by the radio 205, while Wi-Fi or HomePlug signals are filtered out. In some embodiments, the frequency-agile tuner 250 and the signal acquisition circuitry 245 may be integrated into a single device.

The ADC 255 may convert high frequency analog signals captured by the front end circuitry 245 into lower frequency digital signals for baseband processing later. Conversely, the DAC 260 may convert lower frequency digital signals into high frequency analog signals to be transmitted to external devices through the front end circuitry 245.

The digital filter 265 may include one or more tunable digital filters that may be tuned to filter out signals from undesired frequency bands. The digital filter 265 may also have a tunable bandwidth for its pass-band. For example, if a Wi-Fi signal is desired, the digital filter 265 may be used to filter out signals that are outside the Wi-Fi band. The digital filter 265 may also be used to eliminate signal artifacts that were injected into the frequency-agile tuner 250 by the oscillators and mixers.

The baseband circuitry 270 may include various mixers, oscillators, processors, and/or amplifiers to carry out baseband processing of the interference signals captured by the radio 205. It is understood that the radio 205 may include additional circuitries that are not illustrated herein for the sake of simplicity.

The signal processing and analysis section 220 may also be referred to as a signal analyzer and may be implemented as digital circuit blocks, or as software code, or a combination of both. The signal processing and analysis section 220 may also be integrated into the host device on which the cognitive spectrum analyzer 200 is embedded. The signal processing and analysis section 220 may receive the frequency-down-converted signal from the radio 205 and carry out sampling and processing of that signal, for example through a Fast Fourier Transform (FFT) operation.

The signal processing and analysis section 220 may also include a signal library that may be used to further identify characteristics of the signal captured by the radio 205. The signal library may contain heuristics of signals that correspond to a variety of communications protocols, including signals from Wi-Fi, MoCA, and HomePlug. Based on the result of the signal analysis, the signal processing and analysis section 220 may be able to recommend a course of action for other devices on the network, so that problems caused by the interfering signal may be minimized. This will be discussed later using examples in association with FIGS. 5-7.

The processor 225 may be used in conjunction with the signal processing and analysis section 220 to implement signal processing tasks. The processor 225 may also be used to execute instructions stored on the memory storage 230. From the above discussions, we can see that the cognitive spectrum analyzer 200 may be capable of detecting interference signals, analyzing the interference signals, and offering advice regarding ways to minimize potential damages caused by the interference signals. These spectrum monitoring and management capabilities may be considered some of the services offered by the cognitive spectrum analyzer 200.

Other network devices may have network capabilities that may also be considered services. These services may include: network optimization services that may adjust network parameters based on deployment cost, network capacity, or quality of service; security services that may manage the security settings of the network and also identify and block intruders; location services that may determine coverage map of the network and ascertain exact locations of devices on the network; and data mining services that gather data such as spectrum information and store data into a database. Other services may be offered, but they are not discussed herein for the sake of simplicity.

The interface 240 may serve as a communication and control interface between the cognitive spectrum analyzer 200 and external devices, for example between the cognitive spectrum analyzer and the DSL gateway 45 of FIG. 1. The interface 240 may be implemented as software code that may reside on the processor 225 or the memory storage 230.

When the cognitive spectrum analyzer 200 is coupled to a network, for example the network 20 of FIG. 1, the interface 240 may be able to: broadcast or advertise services offered by the cognitive spectrum analyzer 200 to other devices on the network; accept requests to subscribe to these services from other devices on the network; accept general information inquires from other devices on the network; and accept instructions from other devices on the network that may alter functions or configuration of the cognitive spectrum analyzer 200.

These other devices on the network 20 communicating with the cognitive spectrum analyzer 200 may also be referred to as clients, and the interface 240 may also be referred to as a controller of the cognitive spectrum analyzer 200. In instances where the cognitive spectrum analyzer 200 is embedded in its host device, the host device may also be a client of the cognitive spectrum analyzer 200, and the cognitive spectrum analyzer 200 may be able to advertise the services offered by its host device to other devices on the network as well.

Communication between clients and the cognitive spectrum analyzer 200 may be carried out using network profiles. More specifically, the cognitive spectrum analyzer 200 and the clients may each include a network profile, such as a Universal Plug and Play (UPnP) profile, that defines a set of services and events that are offered by the cognitive spectrum analyzer 200 or by the client. These services and events are available for subscription.

The network profiles may be implemented in the form of software code. For example, the network profile of the cognitive spectrum analyzer 200 may be implemented as a thread of software code that is run by the interface 240. The network profiles of the cognitive spectrum analyzer 200 and the client may be different, but they can communicate with each other and selectively subscribe to each other's services and events. In this manner, the cognitive spectrum analyzer 200 may be used to advise a client with regards to its course of action in an application layer level of the seven-layer Open System Interconnection (OSI) Reference Model of computer networking. The ultimate decision is still made by the client, however. This will be discussed later in more detail.

Figure 4:
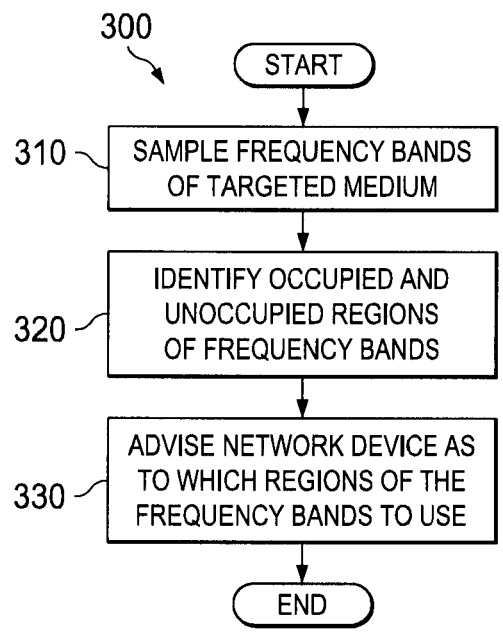
FIG. 4 is a flowchart according to one embodiment that illustrates how the cognitive spectrum analyzer of FIG. 3 evaluates the network to which it is coupled at an initial configuration time.

FIG. 4 is a flowchart illustrating a method 300 of how the cognitive spectrum analyzer 200 evaluates the network to which it is coupled at an initial configuration time. The method 300 begins with step 310 in which the cognitive spectrum analyzer 200 samples the frequency bands of interest with respect to a targeted medium. The targeted medium may be air, coaxial cables, power lines, or phone lines. The method 300 continues with step 320 in which the cognitive spectrum analyzer 200 identifies which regions of the frequency bands of interest are occupied and which regions are unoccupied. The method 300 continues with step 330 in which the cognitive spectrum analyzer 200 advises devices on the network as to which unoccupied regions of the frequency bands are safe to use, meaning which unoccupied regions are least likely to cause interference problems.

Figure 5:
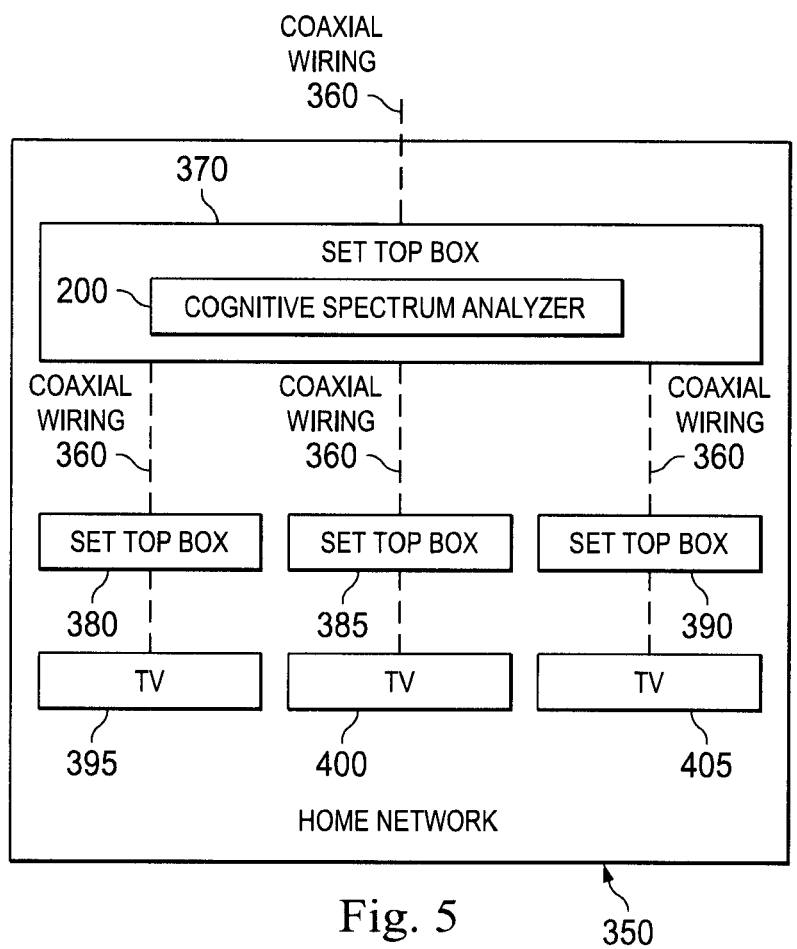
FIGS. 5-7 are simplified diagrammatic views of various example networks that utilize the cognitive spectrum analyzer of FIG. 3 to minimize signal interference.
Figure 6:
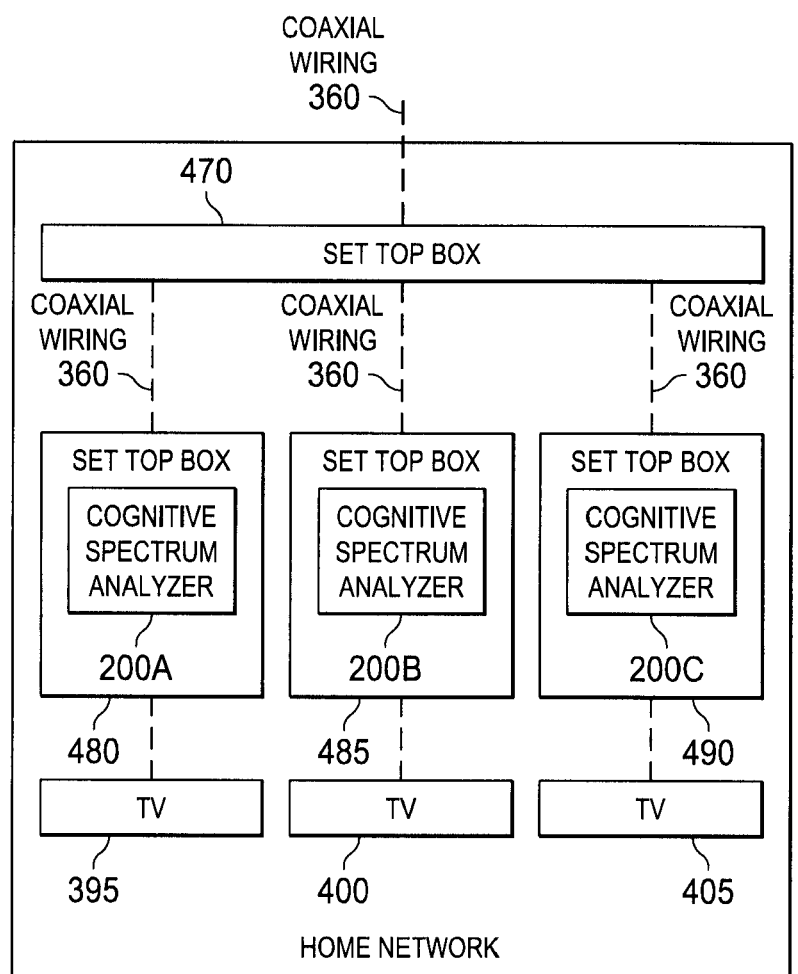
Figure 7:
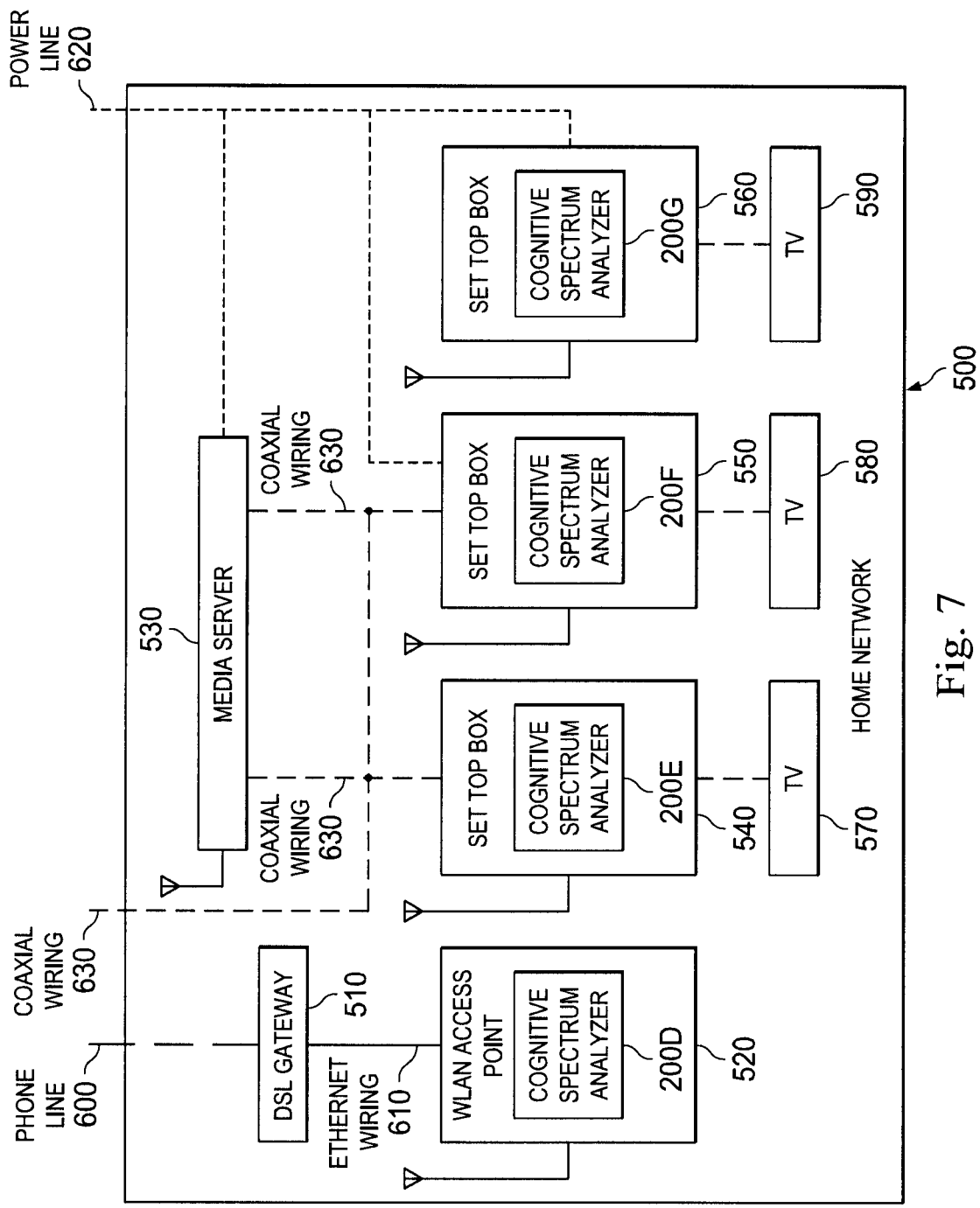

FIGS. 5-7 are simplified diagrammatic views of example networks that utilize the cognitive spectrum analyzer 200. FIGS. 5-7 help illustrate various scenarios in which the cognitive spectrum analyzer 200 can be used to mitigate problems caused by interference signals. Referring to FIG. 5, an example home network 350 includes coax wiring 360 that extends beyond the network 350 (outside the home), a set top box 370 that includes an instance of the embedded cognitive spectrum analyzer 200 of FIG. 3, set top boxes 380, 385, and 390 that are coupled to the set top box 370, and TVs 395, 400, and 405 that are respectively coupled to the set top boxes 380, 385, and 390.

Media content such as one or more video streams may be received by the set top box 370 through the coax wiring 360. The set top box 370 may have a plurality of tuners that can each handle a different video stream and extract data out of the video stream. The set top box 370 then sends the data extracted from the different video streams to the set top boxes 380, 385, and 390 under a given network protocol, for example MoCA. The set top boxes 380, 385, and 390 need no tuners and may contain hardware that can convert the data received from the set top box 370 into respective video signals such as HDMI video signals. The set top boxes 380, 385, and 390 may then output the video signals to the TVs 395, 400, and 405 to be displayed, respectively.

Using its network profile, the cognitive spectrum analyzer 200 may advertise its services and events as well as the services and events offered by the set top box 370 to the rest of the home network 350. The set top boxes 380, 385, and 390 may subscribe to those services and events. When an interference signal is detected by the cognitive spectrum analyzer 200, the cognitive spectrum may perform data analysis on the interference signal. If the data analysis indicates that the interference is network-wide and may prevent the media content from reaching the set top boxes 380, 385, and 390, the set top box 370 may decide to begin buffering the incoming media content.

At the same time, the cognitive spectrum analyzer 200 may broadcast the interference event to the set top boxes 380, 385, and 390. The set top boxes 380, 385, and 390 may receive the interference event, and depending on their own programming instructions, may either pause live TV and/or ask the TV user to accept a lower bit-rate transmission. The TV user may then act accordingly.

When the cognitive spectrum analyzer 200 decides that the interference signal is no longer present, it may inform the set top boxes 380, 385, and 390 of this, and consequently the set top box 370 may decide to resume data transmission to the set top boxes 380, 385, and 390. The set top boxes 380, 385, and 390 may decide to either resume TV play automatically or ask the TV user to resume play manually. When the TV play is eventually resumed, no data is lost due to the interference signal, since the data has been buffered by the set top box 370. In this manner, the cognitive spectrum analyzer 200 helps mitigate potential damages caused by the interference signal.

Referring now to FIG. 6, another example home network 450 is similar to the home network 350, thus similar devices are labeled the same in both of these networks. The home network 450 may include a set top box 470 that may not have an embedded cognitive spectrum analyzer, and set top boxes 480, 485, and 490 that contain embedded cognitive spectrum analyzers 200A, 200B, and 200C, respectively.

Using their respective network profiles, the cognitive spectrum analyzers 200A, 200B, and 200C may each advertise its own services and events as well as the services and events offered by their respective host set top box to other devices on the network 450. The set top boxes 470, 480, 485, and 490, acting as clients, may selectively subscribe to those services and events.

Different scenarios involving interference events for the network 450 are now discussed. In one scenario, the cognitive spectrum analyzer 200A may detect an interference signal and may subsequently send out an event message as an alarm to its clients. The cognitive spectrum analyzers 200B and 200C may decide that the interference signal detected by the cognitive spectrum analyzer 200A is local to the set top box 480 and may not adversely affect the set top boxes 485 and 490. Therefore, the set top boxes 485 and 490 may decide to ignore the alarm and to keep playing the video signals.

Meanwhile, in response to the alarm, the set top box 470 may decide that the video stream for the set top box 480 needs to be buffered. Thus, the set top box 470 may begin buffering the video stream for the set top box 480 but may keep sending the video streams to the set top boxes 485 and 490. Also, based on the input received from the cognitive spectrum analyzer 200A, the set top box 480 may decide to either pause live TV or ask the TV user to accept a lower bit-rate transmission for the TV program to continue.

In another scenario, the cognitive spectrum analyzers 200A and 200B may both detect an interference signal and may subsequently send out event messages as alarms to all their clients. The cognitive spectrum analyzer 200C may decide that the interference signal detected by the cognitive spectrum analyzers 200A and 200B will not adversely affect the set top box 490, and thus the set top box 490 may decide to ignore the alarm and to keep playing the video signal.

Meanwhile, in response to the alarm, the set top box 470 may make one of two decisions: 1) the interference signal detected by the cognitive spectrum analyzers 200A and 200B is local, and thus only the video streams for the set top boxes 480 and 485 need to be buffered; or 2), the interference signal detected is global and may impact the entire network 450, including the set top box 490.

If the first decision is made, the set top box 470 may begin buffering the video streams for the set top boxes 480 and 485 but may keep sending the video stream to the set top box 490 without buffering. If the second decision is made, the set top box 470 may begin buffering the video streams for all three set top boxes 480, 485, and 490. In response to the inputs received from the cognitive spectrum analyzers 200A and 200B, the set top boxes 480 and 485 may decide to either pause live TV or ask the TV user to accept a lower bit-rate transmission for the TV program to continue.

When the cognitive spectrum analyzer 200A or 200B decides that the interference signal is no longer present, it may notify the set top box 470 of this. The set top box 470 may then decide to resume data transmission to the set top box 480 or 485, but may still decide to continue buffering for the other set top box whose cognitive spectrum analyzer has not indicated that the interference signal is gone. Whenever TV play is eventually resumed, no data will be lost, since the set top box 470 has been buffering data.

Referring to FIG. 7, another example home network 500 may include a DSL gateway 510, a WLAN access point 520, a media server 530, set top boxes 540, 550, 560, and TVs 570, 580, and 590. The DSL gateway 510 may be coupled to a phone line 600 that extends beyond the network 500 (outside the home) and may obtain Internet access through the phone line 600. The WLAN access point 520 may be coupled to the DSL gateway 510 through Ethernet wiring 610. The WLAN access point 520 may also include an embedded cognitive spectrum analyzer 200D. The WLAN access point 520 may be wirelessly coupled to the media server 530.

The media server 530 may be coupled to a phone line 620 that extends beyond the network 500. The media server 530 may be wirelessly coupled to the set top boxes 540, 550, and 560. In addition, the media server 530 may be coupled to the set top boxes 540 and 550 through coax wiring 630. The set top boxes 540, 550, and 560 may have embedded cognitive spectrum analyzers 200E, 200F, and 200G, respectively. The set top boxes 540, 550, and 560 may be coupled to TVs 570, 580, and 590, respectively, through coax wiring 630. The set top boxes 550 and 560 may also be coupled to the power line 620.

Using their respective network profiles, the cognitive spectrum analyzers 200D, 200E, 200F, and 200G may each advertise a list of services and events available for subscription to other devices (clients) on the home network 500. The other devices on the home network 500 as clients may selectively subscribe to these services and events. For example, the cognitive spectrum analyzers 200D-G may offer the following as a service: constantly monitoring the available wireless channels and reporting back a list of clean channels—channels that have no or very low levels of noise or interference signals. The WLAN access point 520 may subscribe to such services and may keep track of this list of clean channels.

Normally, the WLAN access point 520 may stream video signals wirelessly (for example, over the Wi-Fi medium) to the media server 530, which may then extract data from these video signals and thereafter send the extracted data wirelessly to the set top boxes 540, 550, and 560. The set top boxes 540, 550, and 560 may convert the wirelessly received data from the media server 530 into HDMI signals and then send them to be played on the TVs 570, 580, and 590.

Now, suppose interference signals are detected by one or more of the cognitive spectrum analyzers 200D-G. These cognitive spectrum analyzers 200D-G may then broadcast the detection of interference signals as events to the devices on the network 500 that are clients of the cognitive spectrum analyzers, including the WLAN access point 520. The WLAN access point 520 may look at the list of clean channels that it was keeping track of and select the best one for transmission from that list. The WLAN access point 520 may then ask the media server 530 and the set top boxes 540, 550, and 560 to all switch to this newly selected channel so that the interference signal can be avoided.

The media server 530 may receive the announced interference events from the cognitive spectrum analyzers 200E-G as well. In response to these interference events, the media server may independently decide to begin buffering data, regardless of whether a data buffering request has been issued by the WLAN access point 520. Meanwhile, the media server 530 may choose an alternative transmission path to each of the set top boxes 540, 550, and 560, rather than continuing transmission using the wireless path.

For example, a coax path exists between the media server 530 and the set top box 540, and a power line path exists between the media server 530 and the set top box 560, and both a coax path and a power line path exist between the media server 530 and the set top box 550. As such, the media server 530 may decide to switch the transmission path from the wireless path to a coax path to the set top box 540, and to switch the transmission path from the wireless path to a power line path to the set top box 560.

The set top boxes 540 and 560 may then receive notice from the media server 530 that the physical transmission path will be switched, and that the set top boxes 540 and 560 should make adjustments accordingly. As to the set top box 550, the media server 530 may query the cognitive spectrum analyzer 200F whether the coax path or the power line path would be a better path for the set top box 550. Based on the feedback from the cognitive spectrum analyzer 200F, the media server 530 may switch the transmission path from the wireless path to either the coax path or the power line path.

If the interference is particularly bad for one of the set top boxes, for example the set top box 540, such that the set top box 540 cannot communicate with the WLAN 520 nor the media server 530, the set top box 540 may fail to acknowledge the request from the WLAN access point 520 to switch the wireless channel. The set top box 540 may also fail to respond to the request from the media server 530 to change the physical path of transmission. In that case, the WLAN access point 520 may ask the media server 530 to continue buffering for the set top box 540 until further notice.

Meanwhile, the set top box 540 may decide to display an alarm message to a user watching the TV 570, for example a message that reads, "Network cannot be detected. Please be patient." Whenever the communication between the set top box 540 and the media server 530 resumes, the set top box 540 may be able to retrieve and play the lost data from the buffer that was saved by the media server 530, so that the user would not miss any part of the TV programming. In other words, no data will be lost as a result of the interference signals.

Alternatively, the set top boxes 540, 550, and 560 may acknowledge the channel change request from the WLAN access point 520, but the interference may be particularly bad for the media server 530, such that the media server 530 cannot communicate with the WLAN access point 520 or the set top boxes 540, 550, and 560. If this happens, the set top boxes 540, 550, and 560 may decide to display an alarm message to the users watching the TVs 570, 580, and 590 that the network is recovering from interference, and that programming will resume as soon as possible.

In each of the scenarios described above, the devices on the network 500 may be able to make intelligent decisions based on the services and events offered by the cognitive spectrum analyzers 200D-G. These devices may also be able to advise other devices on the network 500 and may be able to inform the user as to what is being done to fix the problem. As such, the decision making has been distributed throughout the network, which may result in increased network efficiency and faster response time when signal interference problems arise.

It is understood that different combinations of the home networks 350, 450, and 500 may be envisioned and implemented, and that more cognitive spectrum analyzers may be utilized. As additional cognitive spectrum analyzers are included in the network, the health of the network may be diagnosed more comprehensively, since each cognitive spectrum analyzer may be better suited to gauge the network health pertaining to a particular portion of the network. Furthermore, with additional cognitive spectrum analyzers, more frequency bands may be monitored simultaneously.

For at least these reasons stated above, potential interference signals may be identified and mitigated more quickly. In other words, the present disclosure offers a distributed network topology in which no centralized server is required to make decisions for the devices on the network. Instead, each of the devices on the network may make intelligent decisions on their own based on the input provided by the cognitive spectrum analyzers. This distributed implementation scheme is one of the advantages offered by the embodiments disclosed herein.

Another advantage offered by the embodiments disclosed herein is that application level control is achieved—such as data buffering, pausing TV, and displaying messages to users—through the utilization of services and events offered by the cognitive spectrum analyzers. Yet another advantage offered by the embodiments disclosed herein is that physical path of transmission may be changed, for example from a wireless path to a coax path or to a power line path. In other words, the present disclosure enables the use of redundant routing paths to minimize signal loss due to interference. However, it is understood that these advantages are not meant to be limiting, and different embodiments may offer different advantages, and that no particular advantage is required for any embodiment.

Figure 8:
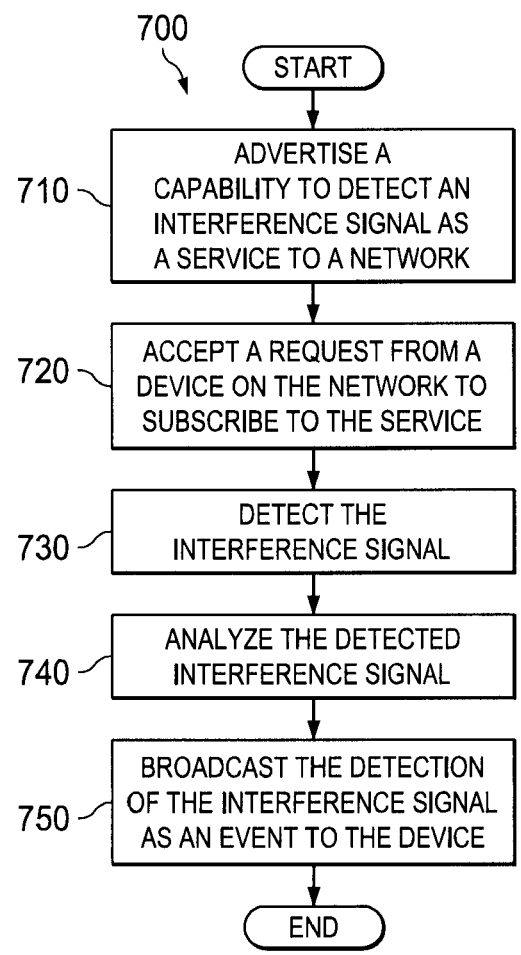
FIG. 8 is a flowchart that illustrates a method of reducing signal interference in a network according to one embodiment.

FIG. 8 illustrates a method 700 of reducing signal interference in a network. The method 700 begins with step 710 in which a capability to detect an interference signal is advertised as a service to a network. The method 700 continues with step 720 in which a request to subscribe to the service from a device on the network is accepted. The method 700 continues with step 730 in which the interference signal is detected. The method continues with step 740 in which the detected interference signal is analyzed. The method continues with step 750 in which the detection of the interference signal is broadcast as an event to the device.

From the foregoing discussions, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. An apparatus, comprising:
    a receiver configured to detect an interference signal;
    a signal analyzer configured to analyze the detected interference signal; and
    an interface configured to:
        advertise detection of the interference signal as a service offered by the apparatus to a network device;
        accept a request from the network device to subscribe to the service;
        alert the network device when the interference signal is detected; and
        recommending a course of action for the device in response to the analyzing, comprising:
            buffering a signal stream in response to the broadcasting;
            pausing a display;
            prompting a user to perform both of the following actions:
                waiting for the display to resume; and
                continuing the display by accepting a lower bit-rate transmission.

2. The apparatus of claim 1, wherein the receiver comprises:
    a digital filter having a tunable bandwidth for its pass-band; and
    a frequency-agile tuner operable to receive signals from a plurality of frequency bands, the plurality of frequency bands corresponding to one or more network protocols that include a wireless protocol, a coaxial protocol, and a power line protocol.

3. The apparatus of claim 1, wherein the interface is configured to advertise analysis of the interference signal as a further service offered by the apparatus to the network device.

4. The apparatus of claim 1, wherein the network device that is external to the apparatus is one of a plurality of network devices on a network, and wherein at least one of the network devices on the network has a spectrum analyzer device implemented therein, the spectrum analyzer containing the receiver, the signal analyzer, and the interface.

5. The apparatus of claim 1, wherein the signal analyzer comprises a signal library that contains heuristics of signals of a network protocol selected from the group consisting of: a wireless protocol, a coaxial protocol, and a power line protocol.

6. The apparatus of claim 1, wherein the apparatus has a first network profile, the network device has a second network profile, and wherein the apparatus communicates with the network device through interaction between the first and second network profiles.

7. The apparatus of claim 1, wherein the interface is configured to advise the network device to perform one of the following tasks:
    switch from a first transmission path to a second transmission path, the first and second transmission paths using different network protocols; and
    switch from a first transmission channel to a second transmission channel, the first and second transmission channels using the same network protocol.

8. A system, comprising:
    a plurality of network devices on a network, wherein one or more of the network devices each have a spectrum analyzing device integrated therein, and wherein each spectrum analyzing device includes:
        a receiver configured to detect an interferer;
        an analyzer configured to analyze the detected interferer and submit, based on the analysis, a recommendation for a selected one of the network devices; and
        a controller interface configured to:
            advertise to the network a list of services offered by the spectrum analyzing device, the detection of the interferer being one of the services;
            allow the network devices to selectively subscribe to the list of services;
            broadcast the detection of the interferer as an event to the network; and
            send the recommendation to the selected network device, wherein the recommendation comprises the following actions:
                buffering a signal stream in response to the broadcasting;
                pausing a display;
                prompting a user to perform both of the following actions:
                    waiting for the display to resume; and
                    continuing the display by accepting a lower bit-rate transmission.

9. The system of claim 8, wherein the receiver comprises a frequency-agile tuner and a frequency-agile filter, the frequency-agile tuner and the frequency-agile filter being coupled together and configured to acquire signals from a plurality of frequency bands that correspond to one or more communications protocols.

10. The system of claim 8, wherein the analyzer comprises a signal library that identifies characteristics of signals that correspond to a plurality of communications protocols.

11. The system of claim 10, wherein the communications protocols comprise a wireless protocol, a coaxial protocol, and a power line protocol.

12. The system of claim 8, wherein the network devices and the spectrum analyzing device have respective network profiles that are used to carry out communication between the spectrum analyzing device and the network devices.

13. The system of claim 8, wherein the spectrum analyzing device and the selected network device are configured to communicate through a plurality of types of network paths that are selected from the group consisting of: a wireless path, a coaxial path, and a power line path.

14. The system of claim 13, wherein in response to the detection of the interferer, the controller interface is configured to change the network path of communication from a first type to a second type that is different from the first type.

15. A method, comprising:
 advertising via an electronic device a capability to detect an interference signal as a service to a network;
 accepting a request from a device on the network to subscribe to the service;
 detecting the interference signal;
 analyzing the detected interference signal;
 broadcasting the detection of the interference signal as an event to the device on the network; and
 recommending a course of action for the device in response to the analyzing, comprising:
  buffering a signal stream in response to the broadcasting;
  pausing a display;
  prompting a user to perform both of the following actions:
   waiting for the display to resume; and
   continuing the display by accepting a lower bit-rate transmission.

16. The method of claim 15, wherein the detecting the interference signal comprises detecting the interference signal from a plurality of frequency bands corresponding to different network protocols that include:
 a first network protocol based on a wireless technology;
 a second network protocol based on a coaxial technology; and
 a third network protocol based on a power line technology.

17. The method of claim 15, wherein the advertising, the accepting, the broadcasting, and the recommending are each carried out using network profiles associated with members of the network.

18. The method of claim 15, wherein the recommending comprises altering a transmission path for the device from a first type to a second type, the first and second types of transmission paths corresponding to different network communication protocols.

* * * * *